US012812331B2

United States Patent

(12) United States Patent
Bansal et al.

(10) Patent No.: US 12,812,331 B2
(45) Date of Patent: Nov. 24, 2026

(54) SYSTEM AND METHOD FOR DELIVERING LOCATION INFORMATION BETWEEN A CALLING PARTY AND A CALLED PARTY

(71) Applicant: DESKOTEL COMMUNICATIONS PRIVATE LIMITED, Noida (IN)

(72) Inventors: Kaushal Bansal, Greater Noida (IN); Rajesh Kumar, Ghaziabd (IN)

(73) Assignee: DESKOTEL COMMUNICATIONS PRIVATE LIMITED, Noida (IN)

(*) Notice: Subject to any disclaimer, the term of this patent is extended or adjusted under 35 U.S.C. 154(b) by 206 days.

(21) Appl. No.: 18/277,822

(22) PCT Filed: Feb. 22, 2022

(86) PCT No.: PCT/IB2022/051533
§ 371 (c)(1),
(2) Date: Aug. 18, 2023

(87) PCT Pub. No.: WO2022/175917
PCT Pub. Date: Aug. 25, 2022

(65) Prior Publication Data

US 2024/0137729 A1 Apr. 25, 2024
US 2024/0236618 A9 Jul. 11, 2024

(30) Foreign Application Priority Data

Feb. 22, 2021 (IN) ............................. 202111007397

(51) Int. Cl.
*H04W 4/029* (2018.01)
*G01S 19/01* (2010.01)
(Continued)

(52) U.S. Cl.
CPC ............. *H04W 4/029* (2018.02); *G01S 19/01* (2013.01); *H04L 65/40* (2013.01); *H04W 4/025* (2013.01)

(58) Field of Classification Search
CPC ......... H04W 4/16; H04W 4/02; H04W 4/029; H04W 4/90; H04W 4/20; H04W 64/00;
(Continued)

(56) References Cited

U.S. PATENT DOCUMENTS 7,966,026 B2 6/2011 Zellner et al.
8,374,628 B1 * 2/2013 Nelissen ........... H04M 3/42357 455/457
(Continued)

FOREIGN PATENT DOCUMENTS

CN 105682042 A 6/2016

OTHER PUBLICATIONS

PCT International Search Report for PCT International Application No. PCT/IB2022/051533.

*Primary Examiner* — Lester G Kincaid
(74) *Attorney, Agent, or Firm* — Olive Law Group, PLLC

(57) ABSTRACT

The present disclosure pertains to a system for delivering location information between a calling party and a called party call including a processor (202), communicatively coupled to a first mobile computing device (106), and a second mobile computing device (110). The first mobile computing device (106), and the second mobile computing device (110) can include a set of sensors configured to determine location of the first mobile computing device (106), and the second mobile computing device (110). The processor (202) can be configured to determine a first displayable location code and a second displayable location code and facilitates transmitting and displaying the first displayable location code to the second mobile computing device (110), and the second displayable location code to the first mobile computing device (106) in online mode. The system (102) can be configured to display the first display-
(Continued)

able location code and the second displayable location code in form of audio, text, pop up.

10 Claims, 5 Drawing Sheets

(51) Int. Cl.
*H04L 65/40* (2022.01)
*H04W 4/02* (2018.01)

(58) Field of Classification Search
CPC ...... H04W 12/06; H04W 4/021; G06Q 50/01; G06Q 30/0261; H04M 3/42042; H04M 3/42348; H04M 1/575; H04M 1/57; H04M 2242/30; H04M 3/42059; H04M 3/42093; H04M 3/42357; H04M 1/65; H04M 2203/2038
See application file for complete search history.

(56) References Cited

U.S. PATENT DOCUMENTS

| | | | | |
|---|---|---|---|---|
| 8,644,847 | B1 | 2/2014 | Nelissen et al. | |
| 10,142,577 | B1 * | 11/2018 | Laird | H04N 21/42222 |
| 10,165,414 | B2 * | 12/2018 | Laws | H04L 69/085 |
| 10,326,725 | B2 * | 6/2019 | Trussel | H04M 3/42382 |
| 2007/0078595 | A1 * | 4/2007 | Song | G08G 1/20<br>701/410 |
| 2009/0197621 | A1 | 8/2009 | Book | |
| 2011/0201356 | A1 * | 8/2011 | George | H04M 3/42348<br>455/566 |
| 2011/0274260 | A1 * | 11/2011 | Vaananen | G06F 16/951<br>707/706 |
| 2014/0128048 | A1 * | 5/2014 | Millard | H04M 3/42042<br>455/415 |
| 2018/0343336 | A1 * | 11/2018 | Oh | H04M 1/72439 |
| 2020/0177728 | A1 | 6/2020 | Thange | |
| 2020/0311424 | A1 * | 10/2020 | Mancuso | G06Q 30/0641 |

* cited by examiner

300

SYSTEM AND METHOD FOR DELIVERING LOCATION INFORMATION BETWEEN A CALLING PARTY AND A CALLED PARTY

CROSS REFERENCE TO RELATED APPLICATIONS

This is a 371 application of PCT International Application Number PCT/IB2022/051533, filed Feb. 22, 2022, which claims priority to Indian Patent Application No. 202111007397, filed Feb. 22, 2021; the disclosures of which are incorporated herein by reference in their entireties.

TECHNICAL FIELD

The present invention relates to the field of telecommunication. More particularly, the present disclosure relates to a system and method for delivering location information between a calling party and a called party.

BACKGROUND

Background description includes information that may be useful in understanding the present invention. It is not an admission that any of the information provided herein is prior art or relevant to the presently claimed invention, or that any publication specifically or implicitly referenced is prior art.

Determining location for mobile handset with ease and identifying location of person associated with the mobile handset and similar mobile computing device can help in resolving safety issues, theft, and other similar situations related to the mobile handset. Updating and notifying exact geographic location of caller to receiver eliminates need of sharing live location. When the person receives a phone call on his/her cellular phone, the call recipient often asks the caller his or her geographical current location. Such an inquiry is especially common when the caller and the recipient are planning to meet, or when one or both parties are trying to get to a specific geographical location. Hence, there is need to provide a caller's current geographical location to a call recipient, eliminating requirement of tracking and safety.

Existing solutions can include sharing locations to each other through Google map or other digital maps or just sharing location coordinates (latitude and longitude information) but no one is exchanging current location information through call (either through just a missed call or answered call). Another solution can include using user data for other information sharing like name, mobile number etc. only like true caller but no one is sharing information after call disconnect. Also, different solution are fetching user location to use it further for own purposes or integrating with third party applications but no one is exchanging with other user (caller and receiver). If user wants to share his/her current location then user have to open third party application and then click to share location, even which is only can be seen through Google map or other digital maps.

There is a need in the existing art to overcome above mentioned problem by bringing a solution that can automatically share current location after call is disconnected or missed, thereby informing the caller and the receiver for their geographic location. The solution can facilitate delivering the caller location and the receiver location with help of audio, text, pop up, flash message, and the like and also enables in determining distance between the caller and the receiver.

OBJECTS OF THE PRESENT DISCLOSURE

Some of the objects of the present disclosure are aimed to provide mitigate one or more problems of the prior art or to at least provide a useful alternative are listed herein below.

An object of the present disclosure is to provide a system and method that facilitates displaying caller location to receiver and receiver location to caller after establishment of call between the caller and the receiver with help of internet connectivity and global positioning system.

Another object of the present disclosure is to provide a system and method that facilitates displaying caller name, phone number, and current location, on display screen of a cellular phone.

An object of the present disclosure is to provide a system and method that aids in issues related to safety of caller and receiver, and theft related to cell phone and similar mobile computing device.

An object of the present disclosure is to provide a system and method that enables exchanging location of the caller and the receiver in event of successful call establishment or when the call is missed and delivering the location in form of audio, text, pop up, flash message, and the like.

SUMMARY

The present invention relates to the field of telecommunication. More particularly, the present disclosure relates to a system and method for delivering location information between a calling party and a called party.

An aspect of the present disclosure pertains to a system for delivering location information between a calling party and a called party. The system may include a processor operatively coupled to a memory, and communicatively coupled to a first mobile computing device and a second mobile computing device, where a set of sensors may be configured in first mobile computing device and a second mobile computing device. The set of sensors may be configured to determine location of a first mobile computing device and a second mobile computing device. The processor may includes a memory storing a set of instructions, where upon execution of the set of instructions, the processor may be configured to receive a first set of data packets from a first mobile computing device associated with an authenticated first entity where the first set of data packets may include user request information pertaining to establishment of call between the first mobile computing device and a second mobile computing device, where a communication channel is established between the first mobile computing device and the second mobile computing device, in response to the received first set of data packets. The processor may be configured to extract a first set of location attributes from the first set of data packets, identity information of the first mobile computing device and second mobile computing device. The processor may be configured to identify the second mobile computing device based on the identity information and correspondingly establish a communication channel between the first mobile computing device and the identified second mobile computing device in response to the identified second mobile computing device. The processor may be configured to receive a second set of data packets from the identified second mobile computing device, where the second set of data packets may pertain to displayed user request information pertaining to the establishment of call between the first mobile computing device and the identified second mobile computing device. The processor may be configured to extract a second set of location attributes from the second set of data packets and match the extracted second set of location attributes of the identified second mobile computing device with a location dataset, where the location dataset may includes pre-stored location attributes of the first mobile computing device and the second mobile computing device. The processor may be configured to transform the matched first set of location attributes and the second set of location attributes of the identified second mobile computing device into a first displayable location code and a second displayable location code, where the first displayable location code and the second displayable location code may be of a pre-defined format. The processor may be configured to transmit the first displayable location code to the identified second mobile computing device and the second displayable location code to the first mobile computing device, from the dataset, where the dataset may include pre-stored map of the first displayable location code, and the second displayable location code, where the processor may be configured to display the first displayable location code on the identified second mobile computing device and the second displayable location code on the first mobile computing device. The processor is configured to display the first displayable location code, and the second displayable location code after a pre-defined time of complete call establishment and pendency of call establishment.

In an aspect, the displayed user request information may include an authentication number associated with the first mobile computing device.

In an aspect, the authenticated first entity may be calling party and the authenticated second entity may be called party, where the communication channel may be established between the calling party and the called party in response to the received first set of data packets and the second set of data packets.

In an aspect, the first set of location attributes may include any or a combination of positioning coordinates, geographic location, geographical lines of latitude and longitude of the first mobile computing device, and the second set of location attributes may include any or a combination of positioning coordinates, geographic location, geographical lines of latitude and longitude of the second mobile computing device.

In an aspect, the processor may be configured to map the position coordinates with displayable location code stored in the dataset pertaining to position coordinates data base and transforming the position coordinates to an address.

In an aspect, the first displayable location code may pertain to address of the first mobile computing device and the second location code pertain to address of the second mobile computing device, where the address may be in pre-defined format, and where the pre-defined format may include block number with name of a pre-stored area.

In an aspect, the processor may be configured with a positioning unit, where the positioning unit may facilitate determining position coordinates of the first set of location and the second set of location, where the positioning unit may include any or a combination of global positioning system, NAVIC, Wi-Fi positioning system, and geographic information system.

In an aspect, the first displayable code and the second displayable code may be displayed on the first mobile computing device and the second computing device is in form of audio message, text message, push, pop up, and flash message.

Another aspect of the present disclosure pertains to a method for delivering location information between a calling party and a called party. The method may include receiving, by a processor, a first set of data packets from a first mobile computing device associated with an authenticated first entity, where the first set of data packets may include user request information pertaining to establishment of call between the first mobile computing device and a second mobile computing device, where a communication channel may be established between the first mobile computing device and the second mobile computing device, in response to the received first set of data packets. The processor may be operatively coupled to a memory, and communicatively coupled to a first mobile computing device and a second mobile computing device, where a set of sensors may be configured in the first mobile computing device and the second mobile computing device. The set of sensors may be configured to determine location of a first mobile computing device and a second mobile computing device, where the memory may be storing a set of instructions executable by the processor. The method may include extracting, by the processor, a first set of location attributes from the first set of data packets, an identity information of the first mobile computing device and second mobile computing device. The method may include identifying, by the processor, the second mobile computing device based on the identity information and correspondingly establish a communication channel between the first mobile computing device and the identified second mobile computing device, where the processor may be configured to receive a second set of data packets from the identified second mobile computing device. The second set of data packets may pertain to displayed user request information pertaining to the establishment of call between the first mobile computing device and the identified second mobile computing device. The method may include extracting, by the processor, a second set of location attributes from the second set of data packets. The method may include matching, by the processor, the extracted second set of location attributes of the identified second mobile computing device with a location dataset, where the location dataset may include pre-stored location attributes of the first mobile computing device and the second mobile computing device. The method may include transforming, by the processor, the matched first set of location attributes and the second set of location attributes of the identified second mobile computing device into a first displayable location code and a second displayable location code, where the first displayable location code and the second displayable location code may be of a pre-defined format. The method may include transmitting, by the processor, the first displayable location code to the identified second mobile computing device, and the second displayable location code to the first mobile computing device. The processor may be configured to display the first displayable location code on the identified second mobile computing device and the second displayable location code on the first mobile computing device, where the processor may be configured to display the first displayable location code, and the second displayable location code after a pre-defined time of complete call establishment and pendency of call establishment.

Various objects, features, aspects and advantages of the present disclosure will become more apparent from the following detailed description of preferred embodiments, along with the accompanying drawing figures in which like numerals represent like features.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

The present invention relates to the field of telecommunication. More particularly, the present disclosure relates to a system and method for delivering location information between a calling party and a called party.

Figure 1:
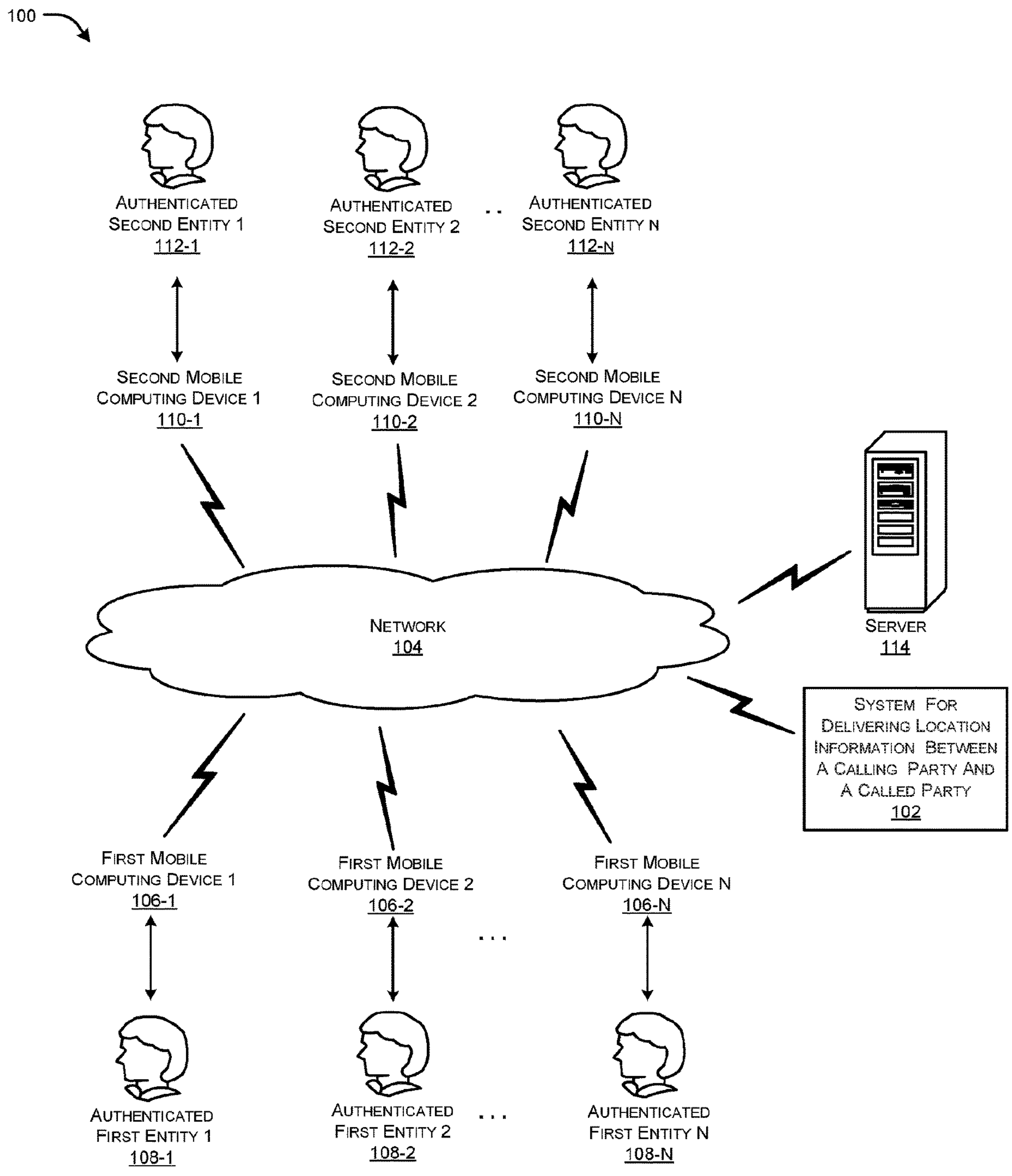
FIG. 1 illustrates a network implementation of proposed system for delivering location information between a calling party and a called party, to elaborate upon its working in accordance with an embodiment of the present disclosure.

FIG. 1 illustrates a network implementation of proposed system for delivering location information between a calling party and a called party, to elaborate upon its working in accordance with an embodiment of the present disclosure.

As illustrated in FIG. 1, the proposed system for delivering location information between a calling party and a called party (interchangeably referred to as system (102), herein) is disclosed and configured with one or more first mobile computing devices (106-1, 106-2 . . . 106-N (collectively referred to as first devices (106)), and individually referred to as first mobile computing device (106), herein), and with one or more second mobile computing devices (110-1, 110-2 . . . 110-N (collectively referred to as second mobile computing devices (110), and individually referred to as second mobile computing device (110), herein), and a server (110), coupled with one another through a network (104) (interchangeably referred to as networking module (104), herein).

In an embodiment, the first mobile computing device (106) can be associated with one or more authenticated first entities (108-1, 108-2 . . . 108-N) (collectively referred as authenticated first entities 108, and individually referred to as authenticated first entity (108), herein). In another embodiment, the second mobile computing device (110) can be associated with one or more authenticated second entities (112-1, 112-2 . . . 112-N)(collectively referred as authenticated second entities 112, and individually referred to as authenticated second entity (112), herein). In an illustrative embodiment, the first mobile computing device (106), and the second mobile computing device (110) can include any or a combination of cell phone, mobile, laptop, a smart phone, a portable computer, a personal digital assistant, a handheld device, computer, but not limited to the like. In another illustrative embodiment, the authenticated first entity (108), and the authenticated second entity (112) can be pre-registered user associated with the first mobile computing device (106), and the second mobile computing device (110).

In an illustrative embodiment, the system (102) can be configured with the server (114) with help of the networking module (104). In another illustrative embodiment, the server (114) can be in communication with the first mobile computing device (106) and the second mobile computing device (110) through the networking module (104), where the networking module (104) can include any or a combination of Wireless local area network (WLAN), Wireless fidelity (Wi-fi), Worldwide interoperability for microwave access (WiMAX), cellular communication module, and the like, where the networking module (104) can facilitate communication between the server (114), the first mobile computing device (106), and the second mobile computing device (110).

In an embodiment, the first mobile computing device (106) and the second mobile computing device (112) can communicate with each other through the networking module (104). In another embodiment, the first mobile computing device (106) and the second mobile computing device (110) can include a set of sensors. The set of sensors can be configured to sense location of the first mobile computing device (106), and the second mobile computing device (110), where the set of sensors can include any or a combination of global positioning system, geographic information system, location sensor, geographic location sensor, and the like.

In an illustrative embodiment, the system (102) can include one or more processors (interchangeably referred to as processing unit, herein, collectively referred to as processors and individually referred to as processor, herein), where the processor can be operatively coupled to a memory, where the memory can be configured to store a set of instructions, and where the processor is configured to execute the set of instructions, where upon execution of the set of instructions by the processor, the system (102) can be configured to determine exact location of the first mobile computing device (106), and the second mobile computing device (110) and enable in displaying the location of the first mobile computing device (106) on screen of the second mobile computing device (110), and the location of the second mobile computing device (110) on screen of the first mobile computing device (106).

In an illustrative embodiment, the location of the first mobile computing device (106) can be transmitted and displayed on the second mobile computing device (110) and vice versa in form of an audio, text, pop up, and the like. In another illustrative embodiment, the location can include exact address of the first mobile computing device (106), and the second mobile computing device (110). The location or address of the first mobile computing device (106) can be transmitted to the second mobile computing device (110) after a communication channel is established between the first mobile computing device (106), and the second mobile computing device (110).

In an illustrative embodiment, the location of the first mobile computing device (106), and the second mobile computing device (110) can be exchanged in online mode or when the first mobile computing device (106) and the second mobile computing device (110) are communicatively coupled to the network (104) including WLAN, Wi-Fi, mobile cellular communication, and the like. In another illustrative embodiment, the location or address of the first mobile computing device (106), and the second mobile computing device (110) can be displayed after a pre-defined time of answered call and missed call.

In an illustrative embodiment, the processor can be configure to display location information of the first mobile computing device (106), and the second mobile computing device (110) interchangeably in a pre-defined format, where the pre-defined format can include address of the first mobile computing device (106), and the second mobile computing device (110). In another illustrative embodiment, the processor can be configured to determine distance between the first mobile computing device (106), and the second mobile computing device (110), where the distance can be displayed on screen of the first mobile computing device (106), and the second mobile computing device (110).

In an embodiment, the system (102) can be implemented using any or a combination of hardware components and software components such as a cloud, a server (114), a computing system, a computing device, a network device and the like. Further, the first mobile computing device (106) can interact with the second mobile computing device (110) and the server (114) through plurality of the networking module (104), such as Wi-Fi, Bluetooth, Li-Fi, or an application, that can reside in the first mobile computing device (106), and the second mobile computing device (110). In an implementation, the system (102) can be accessed by the networking module (104) or a server (114) that can be configured with any operating system, including but not limited to, Android™, iOS™, and the like.

Further, the network (104) can be a wireless network, a wired network or a combination thereof. The network (104) can be implemented as one of the different types of networks, such as intranet, local area network (LAN), wide area network (WAN), the internet, Wi-Fi, LTE network, CDMA network, and the like. Further, the network (104) can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 can include a variety of network devices, including routers, bridges, servers, computing devices, storage devices, and the like.

Figure 2:
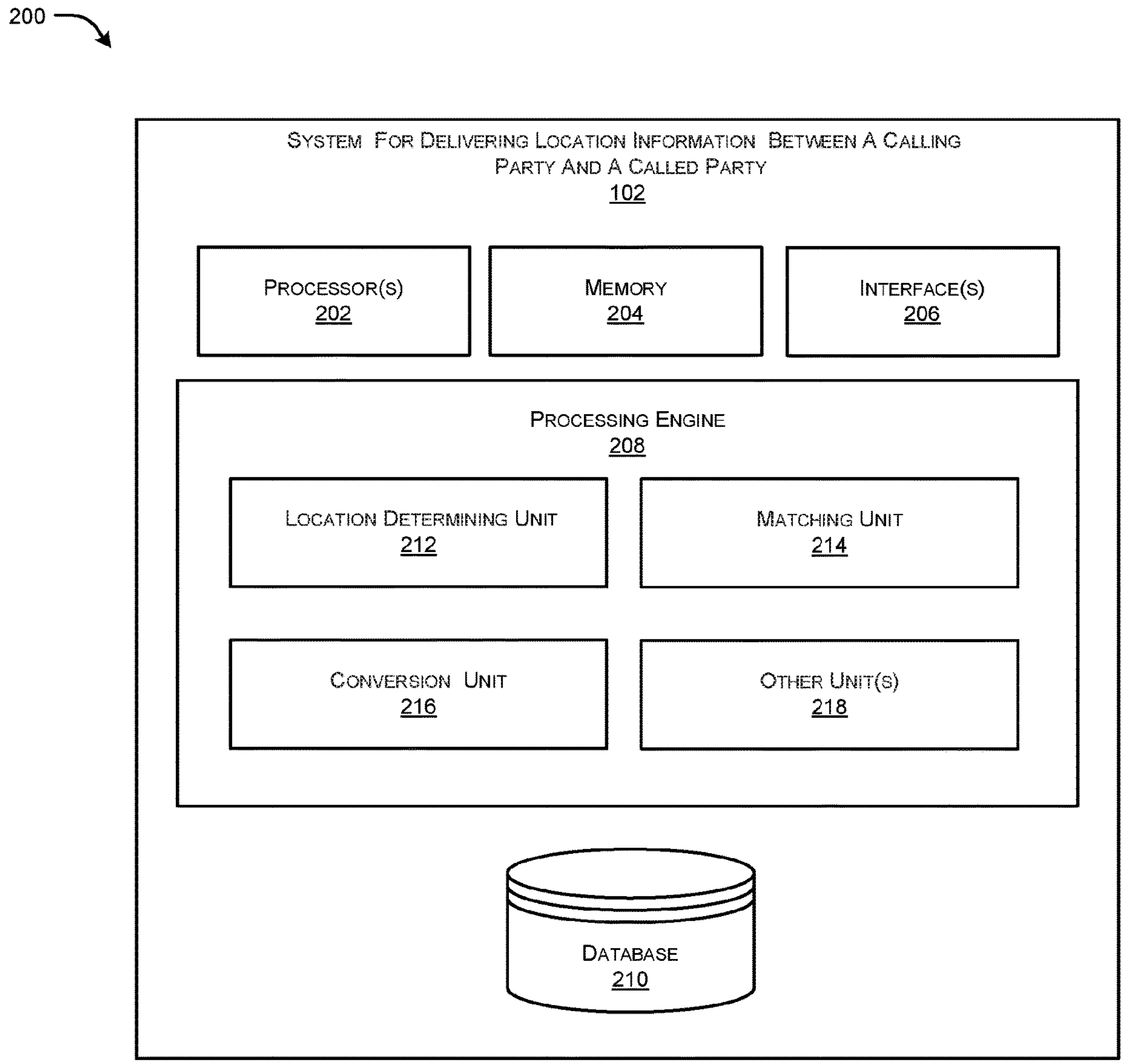
FIG. 2 illustrates exemplary functional components of the proposed system for delivering location information between the calling party and the called party, in accordance with an embodiment of the present disclosure.

FIG. 2 illustrates exemplary functional components of the proposed system for delivering location information between the calling party and the called party, in accordance with an embodiment of the present disclosure.

Figure 3:
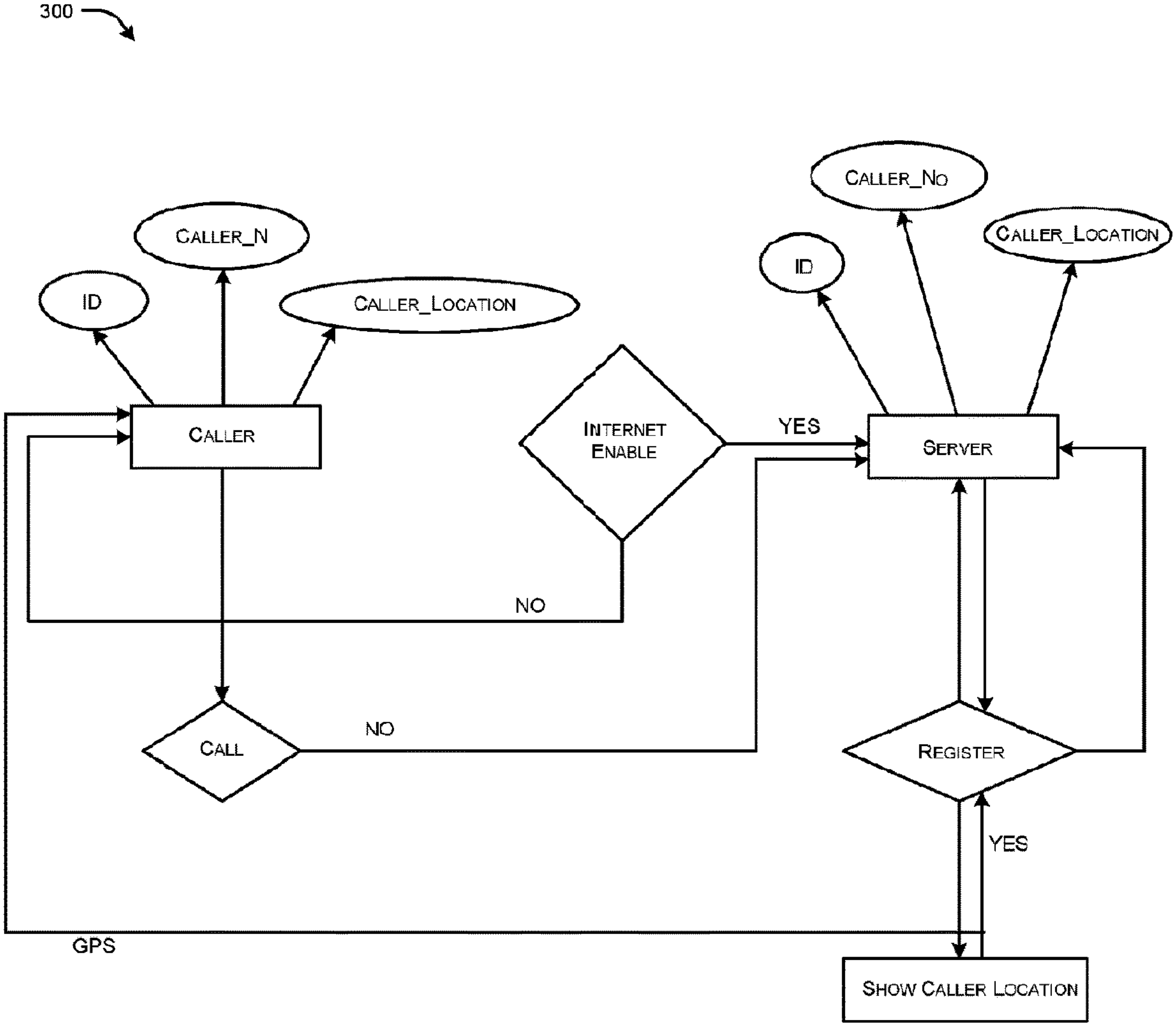
FIG. 3 illustrates an exemplary diagram of the proposed system for delivering location information between the calling party and the called party, in accordance with an embodiment of the present disclosure.

FIG. 3 illustrates an exemplary diagram of the proposed system for delivering location information between the calling party and the called party, in accordance with an embodiment of the present disclosure.

In an aspect, the system (102) can include one or more processor(s) (202). The one or more processor(s) (202) may be implemented as one or more microprocessors, microcomputers, microcontrollers, digital signal processors, central processing units, logic circuitries, and/or any devices that manipulate data based on operational instructions. Among other capabilities, the one or more processor(s) (202) are configured to fetch and execute computer-readable instructions stored in a memory (204) of the system (102). The memory (204) may store one or more computer-readable instructions or routines, which may be fetched and executed to create or share the data units over a network service. The memory (204) can include any non-transitory storage device including, for example, volatile memory such as RAM, or non-volatile memory such as EPROM, flash memory, and the like.

Further, the processing unit 108 can include an interface(s) 206. The interface(s) 206 can include a variety of interfaces, for example, interfaces for data input and output devices, referred to as I/O devices, storage devices, and the like. The interface(s) (206) may facilitate communication of the system (102) with I/O devices, storage devices, network, user etc. The interface(s) (206) may also provide a communication pathway for one or more components of the system (102). Examples of such components include, but are not limited to, processing engine(s) (208) and database (210).

The interface(s) (206) may enable data input interface to input a data associated multimedia frames in form of videos, images, and audio from the system (102). In an embodiment, videos, images, and audio associated with the multi-media frames can be captured using devices, such as, but not limited to, a camera, video-recorder, mic, and the like, that can be configured with said devices, or can be communicably connected to the system (102) through an input interface. The interface(s) (206) may enable data output interface to output data that can include multi-media frames in form of videos, images and audio.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) can include a processing resource (for example, one or more processors), to execute such instructions. In the present examples, the machine-readable storage medium may store instructions that, when executed by the processing resource, implement the processing engine(s) 208. In such examples, the system (102) can include a machine-readable storage medium storing the instructions and the processing resource to execute the instructions, or the machine-readable storage medium may be separate but accessible to the system (102) and other processing resource. In other examples, the processing engine(s) (208) may be implemented by electronic circuitry.

The database (210) can include data that is either stored or generated as a result of functionalities implemented by any of the components of the processing engine(s) (208) or the system (102).

In an embodiment, the processing engine(s) (208) may include a location determining unit (212), matching unit (214), a conversion unit (216), and other unit(s) (218). Other engine(s) (218) can supplement the functionalities of the processing engine (208) or the system (102).

As illustrated in FIG. 2, the system (102), can include processor (202), where the processor (202) can be configured to execute a set of instructions stored in a memory, which on execution causes the system (102) to receive a first set of data packets from a first mobile computing device (106) associated with an authenticated first entity (108). In an illustrative embodiment, the first set of data packets can include user request information pertaining to establishment of call between the first mobile computing device (106), and a second mobile computing device (110), where a communication channel can be established between the first mobile computing device (106), and the second mobile computing device (110), in response to the received first set of data packets. In another illustrative embodiment, the processor (202) can be communicatively coupled to the first mobile computing device (106), and the second mobile computing device (110), where a set of sensors can be configured in the first mobile computing device (106), and the second mobile computing device (110). In another illustrative embodiment, the set of sensors can be configured to determine location of the first mobile computing device (106), and the second mobile computing device (110).

In an embodiment, the location determining unit (212) can include an extraction unit, where the extraction unit can be configured to extract a first set of location attributes from the first set of data packets, and identity information of the first mobile computing device (106), and second mobile computing device (110). In an illustrative embodiment, the location attributes can include any or a combination of geographic location coordinates geographical lines of latitude and longitude, position coordinates, and the like of the first mobile computing device. In another illustrative embodiment, the first set of data packets can include user request information pertaining to call establishment between the first mobile computing device (106), and the second mobile computing device (110), like identification number associated with the first mobile computing device (106), where after receiving the first set of data packets, the communication channel can be established between the first mobile computing device (106), and the second mobile computing device (110).

In an illustrative embodiment, the identity information can include any or a combination of name, username of the authenticated first entity (108), and the authenticated second entity (112), id, number associated with the first mobile computing device (106) and the second mobile computing device (110), where the name, username id, and number can be pre-registered in the first mobile computing device (106), and the second mobile computing device (110). In another illustrative embodiment, the location determining unit (212) can be configured to determine location of the first mobile computing device (106) with help of the global positioning system, geographic information system, Wi-Fi positioning system, and the like, by determining location coordinates of the first mobile computing device (106) that identity information is extracted by the extraction unit.

In an illustrative embodiment, the location determining unit (212) can be configured to determine geographical lines of the latitude and longitude associated with the location of the first mobile computing device (106). In another illustrative embodiment, the location determining unit (212) can be configured to determine position coordinates of the first mobile computing device (106) with help of trilateration, where the trilateration can facilitate determining geographic location of the first mobile computing device (106), where the geographic location, position coordinates, and the like can be stored in the database (210).

In an illustrative embodiment, the other unit(s) can include identification unit, where the identification unit can be configured to identify the second mobile computing device (110) based on the identity information and correspondingly establish a communication channel between the first mobile computing device (106), and the identified second mobile computing device in response to the identified second mobile computing device. In another illustrative embodiment, identity information can facilitate identification of a second mobile computing device from the second mobile computing devices (110).

In an illustrative embodiment, the extraction unit can be configured to receive a second set of data packets from the identified second mobile computing device, where the second set of data packets can pertain to displayed user request information pertaining to the establishment of call between the first mobile computing device (106), and the identified second mobile computing device. In another illustrative embodiment, the extraction unit can be configured to extract a second set of location attributes from the second set of data packets, where the second set of location attributes can include any or a combination of position coordinates, geographical lines of latitude and longitude, location coordinates, and the like, associated with the second mobile computing device (110).

In an illustrative embodiment, the extraction unit can be configured to extract the second set of location attributes of the identified second mobile computing device after the communication channel is established between the identified second mobile computing device and the first mobile computing device (106). In another illustrative embodiment, the second set of data packets pertaining to the displayed user request information can include an authentication number associated with the first mobile computing device (106). In yet another illustrative embodiment, the displayed user request information including authentication number associated with the first mobile computing device (106) can be transmitted to the identified second mobile computing device after the channel establishment.

In an illustrative embodiment, the extracted first set of location attributes and the second set of location attributes can be stored in the database (210). In another illustrative embodiment, the extracted first set of location attributes and the second set of location attributes can be transmitted to the matching unit (214) in machine readable form or binary form. The matching unit (214) can be configured to match the extracted second set of location attributes of the identified second mobile computing device with a location dataset, where the location dataset can includes pre-stored location attributes of the first mobile computing device (106), and the second mobile computing device (110). In yet another illustrative embodiment, the location dataset can be stored in the database (210), and where the matching unit (214) can be configured to map the extracted first set of location attributes and the second set of location attributes with the pre-stored location attributes.

In an illustrative embodiment, matching unit (214) can be configured to create a location map for the extracted first set of location attributes and the second set of location attributes after matching with the pre-stored location dataset. In another illustrative embodiment, the geographical lines of latitude and longitude extracted from the first set of location attributes and the second set of location attributes can be mapped with the geographical lines of latitude and longitude of the location pre-stored in the dataset, where the pre-stored location dataset can include pre-stored location attributes associated with the first mobile computing device (106), and the second mobile computing device (110). In yet another illustrative embodiment, after mapping the extracted first set of location attributes and the second set of location attributes with the pre-stored location attributes, the mapped first set of location attributes and the second set of location attributes can be transmitted to the conversion unit (216).

In an illustrative embodiment, the conversion unit (216) can be configured to receive the mapped first set of location attributes and the second set of location attributes in machine readable form or binary form. In another illustrative embodiment, the mapped first set of location attributes and the second set of location attributes can be in encrypted form and the conversion unit (216) can facilitate decrypting the first set of location attributes and the second set of location attributes by converting in structure form to transmit to the first mobile computing device (106), and the identified second mobile computing device (110), where the structure form can include exact address of the first mobile computing device (106), and the identified second mobile computing device.

In an illustrative embodiment, the conversion unit (216) can be configured transform the matched first set of location attributes and the second set of location attributes of the identified second mobile computing device into a first displayable location code and a second displayable location code, where the first displayable location code and the second displayable location code can be of a pre-defined format. In another illustrative embodiment, the first displayable location code and the second displayable location code can be in structure form and in decrypted form, such that the conversion unit (216) can facilitate transforming the first set of location attributes and the second set of location attributes in address form, where the address can pertain to first displayable location code, and the second displayable location code of the pre-defined format. In yet another illustrative embodiment, the pre-defined format can include a block number along with area name associated with the exact geographic location of the first mobile computing device (106), and the identified second mobile computing device.

In an illustrative embodiment, the conversion unit (216) can be configured to transform the first set of location attributes and the second set of location attributes into the address of the pre-defined format like house number, plot number, and the like along with area name of the first mobile computing device (106), and the identified second mobile computing device. In another illustrative embodiment, the conversion unit (216) can facilitate converting the position coordinates associated with the first mobile computing device (106), and the identified second mobile computing device into the address of the pre-defined format, where the conversion unit (216) can facilitate transmitting the address which is the first displayable location code and the second displayable code to the other unit(s) (218).

In an illustrative embodiment, the other unit(s) (218) can facilitate transmitting the first displayable location code to the identified second mobile computing device and the second displayable location code to the first mobile computing device (106), from the location dataset, where the location dataset can include pre-stored map of the displayable location code, where the other unit(s) (218) can be configured to display the first displayable location code on the identified second mobile computing device and the second displayable location code on the first mobile computing device (106). In another illustrative embodiment, the processor (202) or the other unit(s) (218) can be configured to display the first displayable location code, and the second displayable location code after a pre-defined time of complete call establishment and pendency of call establishment. In yet another illustrative embodiment, the address of the first mobile computing device (106), and the identified second mobile computing device can be exchanged between a calling party and a called party, where the calling party can be the authenticated first entity and the called party can be authenticated second entity.

In an illustrative embodiment, the other unit(s) (218) can be configured to synchronize time of displaying the address of first mobile computing device (106), and the identified second mobile computing device after call is answered or missed, where the first displayable location code and the second displayable location code can be in form of an audio message, text, pop up, flash message, and the like, where the first displayable location code and the second displayable location code pertaining to the address of the first mobile computing device (106), and the identified second mobile computing device can be displayed after the pre-defined time of the answered call or missed call, such that the authenticated first entity and the authenticated second entity can know the exact location.

In an illustrative embodiment, the authenticated first entity can be calling party and the authenticated second entity can be called party, where the communication channel can be established between the calling party and the called party in response to the received first set of data packets and the second set of data packets. In another illustrative embodiment, the processor (202) can facilitate providing nearby location of the authenticated first entity and the authenticated second entity through a server (114) through a server architecture and backend services. In yet another illustrative embodiment, the authenticated first entity (108), and the authenticated second entity (112) can pertain to registered first entity and the second entity, where the first entity and the second entity can enter identification attributes like number, name, username in the first mobile computing device (106), and the second mobile computing device (110) to register with the system (102).

In an illustrative embodiment, the system (102) can reside in the first mobile computing device (106), and the second mobile computing device (110), where the authenticated first entity (108), and the authenticated second entity (112) can be registered with location service and the server (114). In another illustrative embodiment, the system (102) can use Google GPS service and internet connection to determine and exchange first displayable location code and the second displayable location code and facilitates determining location information of the first mobile computing device (106), and the identified second mobile computing device.

In an illustrative embodiment, the other unit(s) (218) can enable in determining distance between the first mobile computing device (106), and the identified second mobile computing device and displaying the determined distance on the first mobile computing device (106), and the identified second mobile computing device. In another illustrative embodiment, the other unit(s) can facilitate determining navigation details, weather reports, and the like with help of a first set of sensors, where the first set of sensors can be configured with the first mobile computing device (106), and the second mobile computing device. In yet another illustrative embodiment, the first set of sensors can include any or a combination of weather sensor, inertial sensor like accelerometer, gyroscope, meteorological sensor, weather transmitter, and the like.

In an illustrative embodiment, the system (102) can facilitate providing location of the first mobile computing device (106) associated with the authenticated first entity (108), whenever, the authenticated first entity receives call from the identified second mobile computing device associated with the identified and authenticated second entity.

As illustrated in FIG. 3, the system (102) can be configured with the first mobile computing device (106) associated with an authenticated first entity (108), and a second mobile computing device (110) associated with an authenticated second entity (110). The authenticated first entity can be a calling party and the authenticated second entity can be a called party. The calling party can install the system (102) in the first mobile computing device (106) and can enter login credentials like number, present location, name and the like in the first mobile computing device (106) for first time only. In another illustrative embodiment, call can be established for the registered number, where the authenticated first entity can enable global positioning system and internet connectivity for the first mobile computing device and can establish a communication channel between the first mobile computing device (106), and the second mobile computing device (110).

In an illustrative embodiment, after the call is established between the calling party and receiver party or called party, either receiver picks the call i.e. answered or missed the call i.e. unanswered/missed. In both cases, both the authenticated first entity (106) and the authenticated second entity (110) can receive each other current nearby location through flash message or text message or voice message (Example of location information can be like—G-20, Sector 63, Noida, Uttar Pradesh), but not limited to the like. In another illustrative embodiment, the authenticated first entity (108), and the authenticated second entity (112) can see complete recent call details with location, along with present and past location history with help of the system (102).

In an illustrative embodiment, the system (102) can facilitate determining total distance or gap between the first mobile computing device (106), and the identified second mobile computing device. In another illustrative embodiment, the system (102) can facilitate exchanging location information pertaining to the calling party and the called party and vice versa on the first mobile computing device (106), and the identified second mobile computing device. When the calling party calls a receiving party, in event of successful call establishment and in case of missed call events, the system (102) can facilitate obtaining geographical location information pertaining to both the calling party and the called party, i.e. locations from where the call is originated and received, and can calculate distance between the calling party and the called party, and delivers the information (location) by way of a flash/push message to both the first mobile computing device (106), and the identified second mobile computing device communication devices.

In an illustrative embodiment, the system (102) can facilitate calculating distance between the first mobile computing device (106), and the indentified second mobile computing device and can facilitate delivering the distance to the first mobile computing device (106), and the indentified second mobile computing device. In another illustrative embodiment, the system (102) can facilitate determining information such as navigation, traffic conditions, weather reports, attractions near the caller, and the likes with help of a first set of sensors configured with the first mobile computing device (106), and the second mobile computing device (110).

Those skilled in the art will appreciate that the presented embodiments are provided just as an example and may be provided in additional details in the scope of the invention and these should not be considered as limiting in any way.

Figure 4:
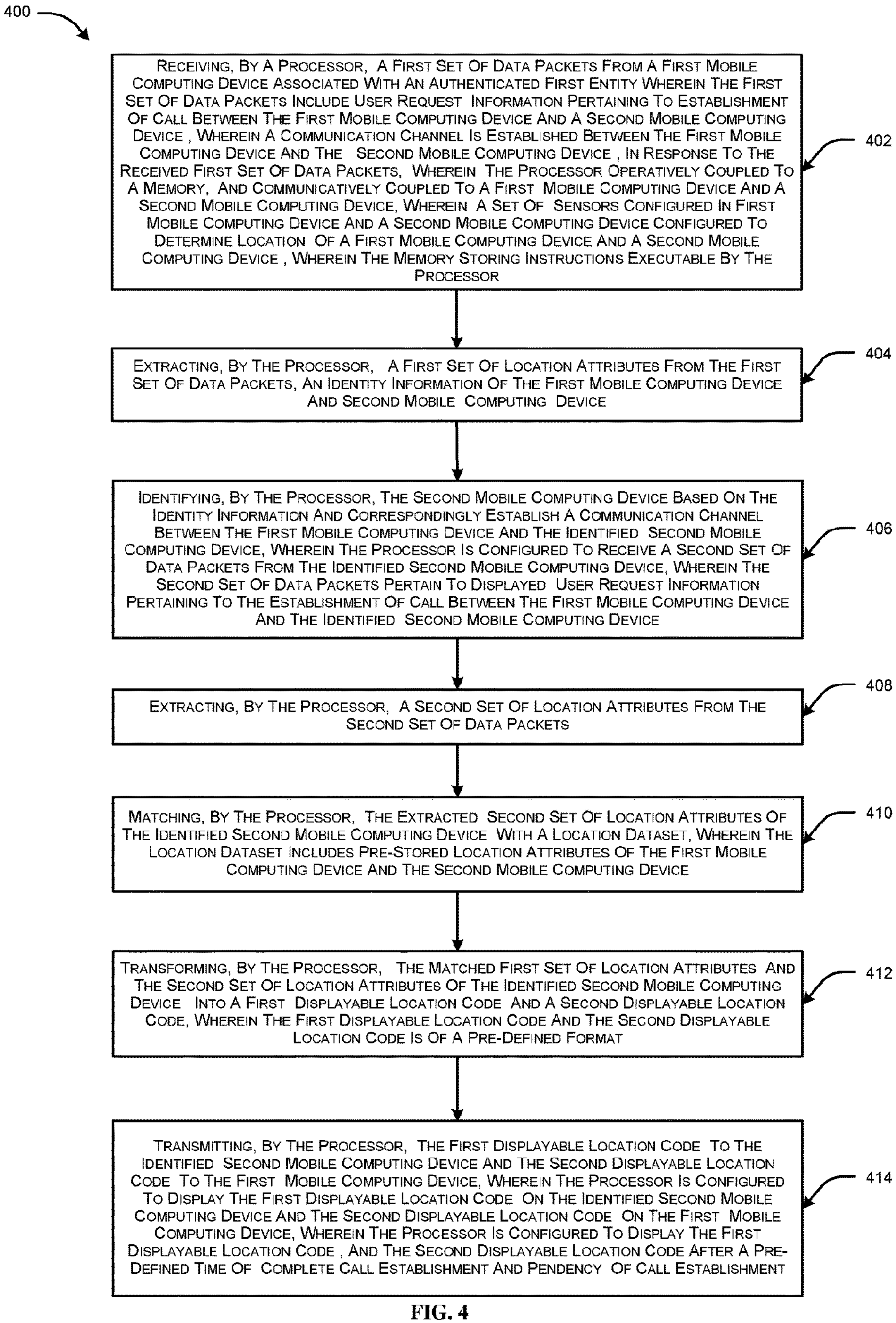
FIG. 4 illustrates a flow diagram illustrating a method for delivering location information between the calling party and the called party, in accordance with an embodiment of the present disclosure.

FIG. 4 illustrates a flow diagram illustrating a method for delivering location information between the calling party and the called party, in accordance with an embodiment of the present disclosure.

In an embodiment, FIG. 4 illustrates a method (400) for delivering location information between a calling party and a called party. The method (400) can include step (402) of receiving, by a processor (202), a first set of data packets from a first mobile computing device (106) associated with an authenticated first entity (108). The first set of data packets can include user request information pertaining to establishment of call between the first mobile computing device (106), and a second mobile computing device (110), where a communication channel can be established between the first mobile computing device (106), and the second mobile computing device (110), in response to the received first set of data packets. The processor (202) can be operatively coupled to a memory, and memory storing a set of instructions executable by the processor (202). The processor (202) can be communicatively coupled to the first mobile computing device (106), and the second mobile computing device (110), where a set of sensors can be configured in the first mobile computing device (106), and a second mobile computing device (110). The set of sensors can be configured to determine location of the first mobile computing device (106), and the second mobile computing device (110).

In an embodiment, the method (400) can include a step (404) of extracting, by the processor (202), a first set of location attributes from the first set of data packets, and identity information of the first mobile computing device (106), and second mobile computing device (110).

In an embodiment, the method (400) can include a step (406) of identifying, by the processor (202), the second mobile computing device (110) based on the identity information and correspondingly establish a communication channel between the first mobile computing device (106), and the identified second mobile computing device, where the processor (202) can be configured to receive a second set of data packets from the identified second mobile computing device. The second set of data packets can pertain to displayed user request information pertaining to the establishment of call between the first mobile computing device (106), and the identified second mobile computing device.

In an embodiment, the method (400) can include a step (406) of extracting, by the processor (202), a second set of location attributes from the second set of data packets.

In an embodiment, the method (400) can include a step (408) of matching, by the processor (202), the extracted second set of location attributes of the identified second mobile computing device with a location dataset, where the location dataset can includes pre-stored location attributes of the first mobile computing device (106), and the second mobile computing device (110).

In an embodiment, the method (400) can include a step (410) of transforming, by the processor (202), the matched first set of location attributes and the second set of location attributes of the identified second mobile computing device into a first displayable location code and a second displayable location code, where the first displayable location code and the second displayable location code can be of a pre-defined format.

In an embodiment, the method (400) can include a step (412) of transmitting, by the processor (202), the first displayable location code to the identified second mobile computing device and the second displayable location code to the first mobile computing device (106), where the processor (202) can be configured to display the first displayable location code on the identified second mobile computing device and the second displayable location code on the first mobile computing device (106), where the processor (202) can be configured to display the first displayable location code, and the second displayable location code after a pre-defined time of complete call establishment and pendency of call establishment.

Figure 5:
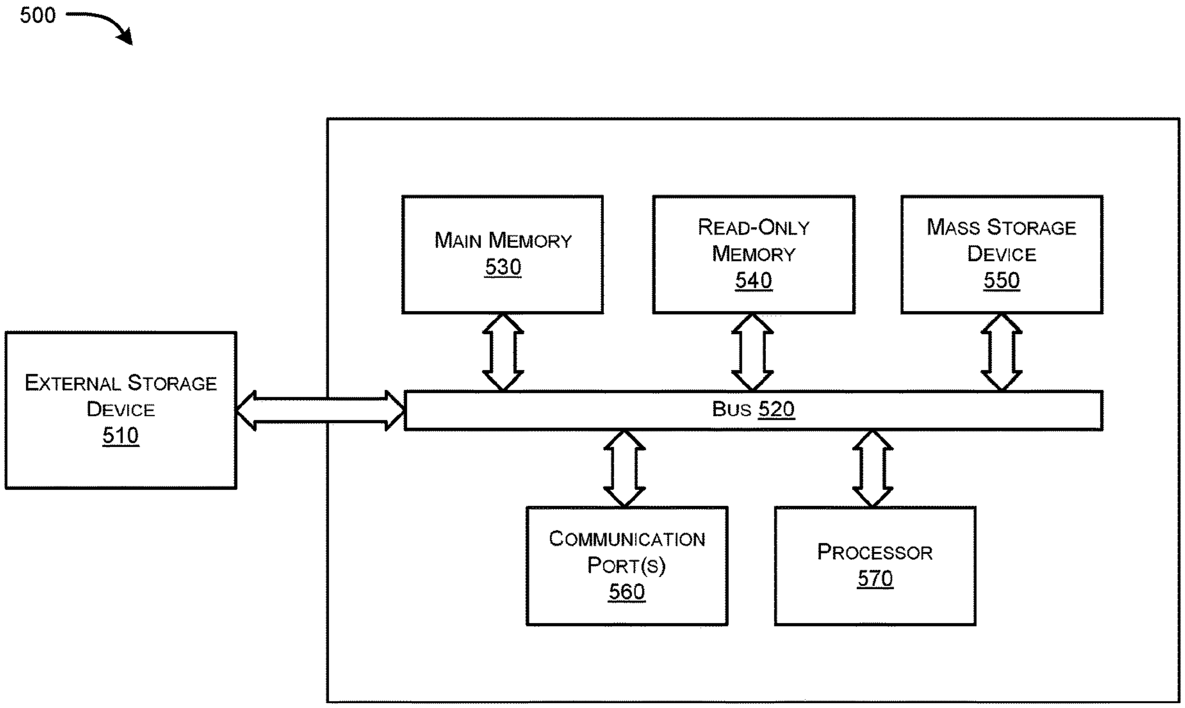
FIG. 5 illustrates an exemplary computer system to implement the proposed system in accordance with embodiments of the present disclosure.

FIG. 5 illustrates an exemplary computer system to implement the proposed system in accordance with embodiments of the present disclosure.

As shown in FIG. 5, computer system includes an external storage device (510), a bus (520), a main memory (530), a read only memory (540), a mass storage device (550), communication port (560), and a processor (570). A person skilled in the art will appreciate that computer system may include more than one processor and communication ports. Examples of processor (570) include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor (570) may include various modules associated with embodiments of the present invention. Communication port (560) can be any of an RS-232 port for use with a modem based dialup connection, a 10/100 Ethernet port, a Gigabit or 10 Gigabit port using copper or fiber, a serial port, a parallel port, or other existing or future ports. Communication port (560) may be chosen depending on a network, such a Local Area Network (LAN), Wide Area Network (WAN), or any network to which computer system connects.

In an embodiment, the memory (530) can be Random Access Memory (RAM), or any other dynamic storage device commonly known in the art. Read only memory (540) can be any static storage device(s) e.g., but not limited to, a Programmable Read Only Memory (PROM) chips for storing static information e.g., start-up or BIOS instructions for processor (570). Mass storage (550) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

In an embodiment, the bus (520) communicatively couples processor(s) (570) with the other memory, storage and communication blocks. Bus (520) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (570) to software system.

In another embodiment, operator and administrative interfaces, e.g. a display, keyboard, and a cursor control device, may also be coupled to bus (520) to support direct operator interaction with computer system. Other operator and administrative interfaces can be provided through network connections connected through communication port (560). External storage device (510) can be any kind of external hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM). Components described above are meant only to exemplify various possibilities. In no way should the aforementioned exemplary computer system limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The proposed disclosure provides a system and method that facilitates displaying caller location to receiver and receiver location to caller after establishment of call between the caller and the receiver with help of internet connectivity and global positioning system.

The proposed disclosure provides a system and method that facilitates displaying caller name, phone number, current location, on display screen of a cellular phone.

The proposed disclosure provides a system and method that aids in issues related to safety of caller and receiver, and theft related to cell phone and similar mobile computing device.

The proposed disclosure provides a system and method that enables exchanging location of the caller and the receiver in event of successful call establishment or when the call is missed and delivering the location in form of audio, text, pop up, flash message, and the like.

We claim:

1. A system for delivering location information between a calling party and a called party, the system comprising:

a first mobile computing device having a set of sensors to determine location of the first mobile computing device;

a second mobile computing device having a set of sensors to determine location of the second mobile computing device; and a server having a processor to:

receive a first set of data packets from the first mobile computing device associated with an authenticated first entity wherein the first set of data packets include user request information pertaining to establishment of call between the first mobile computing device and the second mobile computing device, wherein a communication channel is established between the first mobile computing device and the second mobile computing device, in response to the received first set of data packets;

extract, an identity information of the first mobile computing device and the second mobile computing device;

identify the second mobile computing device based on the identity information and correspondingly establish the communication channel between the first mobile computing device and the identified second mobile computing device in response to the identified second mobile computing device, wherein the processor is configured to:

extract a first set of location attributes from the first set of data packets;

receive a second set of data packets from the identified second mobile computing device, wherein the second set of data packets pertain to displayed user request information pertaining to the establishment of call between the first mobile computing device and the identified second mobile computing device;

extract a second set of location attributes from the second set of data packets;

match the extracted second set of location attributes of the identified second mobile computing device with a location dataset, wherein the location dataset includes pre-stored location attributes of the first mobile computing device and the second mobile computing device;

transform the matched first set of location attributes and the second set of location attributes of the identified second mobile computing device into a first displayable location code and a second displayable location code, wherein the first displayable location code and the second displayable location code is of a predefined format, and transmit the first displayable location code to the identified second mobile computing device and the second displayable location code to the first mobile computing device, from the location dataset, wherein the location dataset includes a pre-stored map of displayable location codes, wherein the processor is configured to display the first displayable location code on the identified second mobile computing device and the second displayable location code on the first mobile computing device, wherein the processor is configured to display the first displayable location code, and the second displayable location code after a pre-defined time of one of an answered call or a missed call between the first mobile computing device and the second mobile computing device, and wherein the processor is configured to synchronize a time of displaying the first displayable location code and the second displayable location code.

2. The system as claimed in claim 1, wherein the displayed user request information includes an authentication number associated with the first mobile computing device.

3. The system as claimed in claim 1, wherein the authenticated first entity is the calling party and an authenticated second entity that is associated with the second mobile computing device is the called party, wherein the communication channel is established between the calling party and the called party in response to the received first set of data packets and the second set of data packets.

4. The system as claimed in claim 1, wherein the first set of location attributes include any or a combination of positioning coordinates, geographic location coordinates, geographical lines of latitude and longitude of the first mobile computing device, and the second set of location attributes include any or a combination of positioning coordinates, geographic location coordinates, geographical lines of latitude and longitude of the second mobile computing device.

5. The system as claimed in claim 4, wherein the processor is configured to map the positioning coordinates with a displayable location code stored in the location dataset pertaining to positioning coordinates data base and transforming the positioning coordinates to an address.

6. The system as claimed in claim 1, wherein the first displayable location code pertains to an address of the first mobile computing device and the second location code pertains to an address of the second mobile computing device, wherein each address is in the predefined format, and wherein the predefined format includes a block number with a name of a pre-stored area.

7. The system as claimed in claim 1, wherein the processor is configured with a positioning unit, wherein the positioning unit facilitates determining position coordinates of the first mobile computing device and the second mobile computing device, wherein the positioning unit includes any or a combination of global positioning system, NAVIC, Wi-Fi positioning system, geographic information system.

8. The system as claimed in claim 1, wherein each of the first displayable location code and the second displayable location code displayed on the first mobile computing device and the second computing device is in a form selected from a group consisting of an audio message, a text message, a push, a pop up, and a flash message.

9. The system of claim 1, wherein the processor is configured to determine position coordinates of the first mobile computing device using trilateration.

10. The system of claim 1, wherein the authenticated first entity and an authenticated second entity that is associated with the second mobile computing device are registered entities, and wherein the first mobile computing device and the second mobile computing device are configured to receive identification attributes comprising one or more of a number, a name, and a username from the respective entities to enable registration with the system.

* * * * *